United States Patent Office 3,422,084
Patented Jan. 14, 1969

3,422,084
REACTIVE WATER-SOLUBLE CUPRIFEROUS DISAZO DYES
Guenther Auerbach and Lukas Schneider, Basel, and Walter Wehrli, Riehen, Basel, Switzerland, assignors to Sandoz Ltd. (also known as Sandoz A.G.), Basel, Switzerland
No Drawing. Filed Feb. 15, 1966, Ser. No. 527,510
Claims priority, application Switzerland, Feb. 19, 1965, 2,336/65
U.S. Cl. 260—146    11 Claims
Int. Cl. C09b 45/28; C09b 33/08

ABSTRACT OF THE DISCLOSURE

Dicopperized reactive disazo dyes bearing at least 5 water-solubilizing groups and wherein a 3-sulfonaphthyl nucleus has azo substituents in each of the 2- and 5-positions, at least one of said substituents being a 2-naphthylazo, at most one of said substituents being a phenylazo and one of said substituents being bound through an amino bridge to a reactive radical, are well-suited to the dyeing of leather and to the dyeing or padding of fibers of natural or regenerated cellulose to obtain products which are stable to resin finishes and are fast to light, washing, water, perspiration, rubbing and alkali.

---

This invention relates to reactive cupriferous disazo dyes of the formula

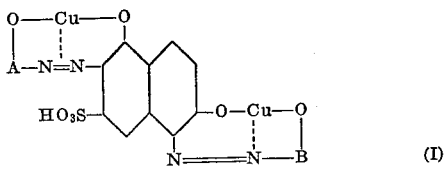

(I)

wherein one of the radicals A or B represents a phenyl radical which may be further substituted or a naphthyl radical which is bound to the N=N group in the 2 position and may be further substituted, the second of these radicals represents a naphthyl radical, which is bound to the N=N group in the 2 position and may be further substituted, with the proviso that the radical A or the radical B contains one —NH—Z group, Z representing a reactive group, and the whole dye molecule including the group —NH—Z contains at least 5 sulfonic acid groups, while the O atom in each instance is in ortho position to the azo group.

A process for the production of the new reactive dyes consists in coupling the diazo compound of an amine of formula

(II)

where w represents a hydroxyl or low molecular alkoxy group in ortho position to the NH₂ group, with a copper-containing dye of formula

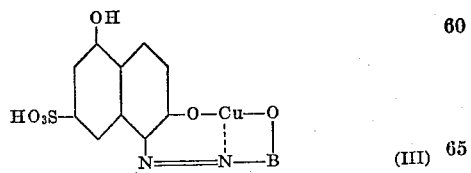

(III)

and converting the product into the copper complex compound; or in coupling the diazo compound of an amine of formula

(IV)

with a dye of Formula III and treating the product with a copper-yielding agent in the presence of an oxidizing agent.

A modification of the process of the invention consists in using a diazo component of Formula II or IV bearing one acylamino or nitro group or a coupling component bearing one amino, nitro or acylamino group and, after the coupling or coppering reaction, replacing the amino, nitro or acylamino group by the NH—Z group. Since the replacement of an acylamino or nitro group takes place in two stages (hydrolysis of the acylamino group or reduction of the nitro group and reaction of the thus formed amino group with the reactive component), the process can be performed in the following sequence: coupling reaction, hydrolysis or reduction, coppering reaction, reaction with the reactive component. In order to avoid possible damage of the free amino group during the oxidative coppering reaction. it is advisable to carry out only the normal coppering reaction when an unprotected amino group is present. For hydrolysis of the acylamino group it is advisable to work in an alkaline medium, e.g., a 2–10% alkali metal hydroxide solution, at 70 to 100° C., while the nitro group can be conveniently reduced with sodium sulfide or sodium hydrogen sulfide in the temperature range of 20° to about 60° C. Since the copper-complex dye is decoppered in the course of the reduction, it must be afterward recoppered.

The copper-containing monazo dyes of Formula III are produced according to the process described in British Patent 727,747.

The reactive radical Z may be the radical of an acylating agent which contains at least one substituent cleavable as an anion and/or a C—C multiple linkage capable of addition. But it is preferably the radicals of an acid bearing at least one halogen atom cleavable as an anion or a group cleavable as an anion, for example

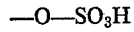

and/or C—C double bond capable of addition. Examples of such acids are chloroacetic, bromoacetic, β-chloro- and β-bromo propionic, α,β-dichloro- or α,β-dibromo-propionic, acrylic, methacrylic, α-chloro- and α-bromo-acrylic, β- or γ-chloro or -bromo-crotonic, α,β-dichloro- or -dibromo-acrylic, β-chloro- or β-bromo-ethylsulfonic, β-sulfatopropionic, β-sulfatoethylsulfonic, vinylsulfonic, β - methylsulfonyloxy- or β-phenylsulfonyloxy-propionic acid or also 2,3-dichloro- or 2,3-dibromo-quinoxaline-6- of -7-carboxylic or -solfonic or -carbamic acid. Alternatively, Z may be the radical of a diazine or triazine compound containing at least two mobile halogen atoms, for example the radical of cyanuric chloride or cyanuric bromide, of a primary condensation product of a cyanuric halide of formula

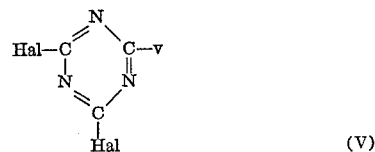

(V)

where Hal represents chlorine or bromine and v the radical, which may be further substituted, of a primary or secondary aliphatic, alicyclic, aromatic or heterocyclic amine, or the radical of an aliphatic, alicyclic, aromatic or heterocyclic hydroxy or thiol compound, but in particular the radical of aniline, its alkyl, sulfonic acid or carboxylic acid derivatives, of low monoalkylamines or dialkylamines or of ammonia; the radical of 2,4,6-trichloropyrimidine or 2,4,6-tribromopyrimidine or their derivatives which are substituted in the 5 position, for example by methyl, carboxy, carboxylic acid methyl ester, carboxylic acid ethyl ester, chlorovinyl, substituted alkyl, such as carboxymethyl, chloromethyl or bromomethyl; 2,4,5,6-tetrachloro-pyrimidine, 2,4,5,6-tetrabromopyrimidine, 5-bromo-2,4,6-trichloropyrimidine, 2,4-dichloro-5-chloromethyl-pyrimidine, 2,4-dibromo-5-bromomethyl pyrimidine, 2,4-dichloro-5-chloromethyl-6-methylpyrimidine, 2,4-dibromo-5-bromomethyl-6-methylpyrimidine.

The coupling reaction of the diazo compound of an amine of Formula II or IV with a coupling component of Formula III is best effected in alkaline medium, preferably at temperatures of 0° to 10° C.

The reaction of the starting dyes or of the disazo dyes obtained therefrom, which contain at least one —NH$_2$ group, with a functional derivative of an acid containing at least one halogen atom cleavable as an anion or a group cleavable as an anion and/or a C—C double bond capable of addition, is carried out preferably with the acid halides or acid anhydrides. It is advisable to react in aqueous medium, preferably with good cooling and in the presence of acid-binding agents, such as sodium carbonate, sodium hydroxide, barium hydroxide, calcium hydroxide or sodium acetate. For acylation, the carboxylic acid halide is used as it is or in solution in two to five times its amount of benzene, chlorobenzene, methylbenzene, dimethylbenzene or acetone, this solution being dropped into the aqueous solution of the compound bearing the amino group at a temperature of 0° to 30° C., preferably at about 2°–5° C., and in the presence of an acid-binding agent, preferably at a pH value of 7 to 3.

For the introduction of the 2,3-dihalogenoquinoxalyl-6- or -7- carbonyl, -sulphonyl or -aminocarbonyl radicals, it is advantageous to use the acid halides, preferably the acid chlorides, or the isocyanates. The acid halides or isocyanates can be used as they are in finely pulverized form or in solution in benzene, toluene or chlorobenzene, and the reaction can be effected in aqueous medium in the temperature range of 0° to about 50° C., or preferably 20–45° C., at a pH value of 3 to 8 or preferably 4 to 7.

The reaction involving the diazine or triazine compounds containing at least two mobile halogen atoms is likewise effected in aqueous medium. The halide can be used as it is in concentrated form or in solution in an organic solvent. Specially suitable solvents are acetone, benzene, chlorobenzene and toluene.

The reaction temperature is adjusted to the reactivity of the starting products and may range from 0° to 100° C. It is 0° to 20° C. for cyanuric chloride and cyanuric bromide, 30° to 60° C. for the monocondensation products containing 2 mobile halogen atoms which are obtained from cyanuric chloride or bromide and ammonia, a primary or secondary amine, or an alcohol, thioalcohol, phenol or thiophenol, and 20° to 100° for dichlorodibromo-, trichloro-, tribromo-, tetrachloro- and tetrabromopyrimidines. If temperatures higher than about 40° C. are necessary, it is advisable to react in a vessel fitted with a reflux condenser because of the volatility in water vapour of the halogenopyrimidines.

The reaction can be effected in an aqueous weakly alkaline, neutral to weakly acid medium, preferably in the pH range of 7 to 3. To neutralize the equivalent of hydrogen halide which is formed in the operation, an acid-binding agent, such as sodium acetate, can be added to the solution at the start of the reaction, or alternatively small portions of sodium or potassium carbonate or bicarbonate in solid, pulverized form or in concentrated aqueous solution can be added during the course of reaction. Aqueous solutions of sodium or potassium hydroxide are also suitable as neutralizing agents. The addition of small amounts of a wetting or emulsifying agent can accelerate the rate of reaction. The reaction is so conducted that only one halogen atom reacts with an exchangeable hydrogen atom of the amino group.

As previously stated, the reactive group Z may be present in the diazo components used as starting products or it may be introduced into the disazo dyes before or after the coppering reaction.

The disazo dyes in which the substituent $w$, capable of metal complex formation, is a hydroxyl group are converted into their copper complex compounds preferably in weakly acid aqueous solution. It is advantageous to allow an amount of copper-yielding agent containing one atom of copper to act upon one molecule of the disazo dye.

When the substituent $w$ is an alkoxy group, the coppering reaction is carried out under conditions which cause cleavage of the alkoxy group, for example in an ammoniacal medium in the presence of hydroxyalkylamines such as mono-, di- or triethanolamine in the temperature range of 80° to about 100° C. in accordance with the process of British Patent 644,883.

The oxidative coppering reaction of the disazo dyes obtained from the diazo components of Formula IV can be carried out, for example, according to the process disclosed in British Patents 660,447, and 721,495, but it is preferable to employ the process specified in Examples 1 to 10 of British Patent 660,447 i.e. in aqueous solution at about 20° to 80° C. using a water-soluble copper salt and hydrogen peroxide.

Examples of suitable copper compounds are cupric sulfate, cupric formate, cupric acetate and cupric chloride.

The resulting copper complex compounds are precipitated from their aqueous solutions by the addition of salt, filtered off, washed if necessary, and dried.

The new cupriferous reactive dyes show little sensitivity to salts, and as they bear at least 5 water-solubilizing groups, they are well soluble in water, which means that the proportion of dye not chemically bound to the fiber is easily washed off after dyeing. The dyes are therefore well suitable for the dyeing of leather and for the dyeing or padding of fibers of natural or regenerated cellulose, in particular by exhaustion dyeing methods. Cellulosic fiber materials dyed or padded with the dyes are aftertreated in alkaline medium at a moderate to high temperature as required, and are subsequently soaped, rinsed and dried. They show good fastness to light and to wet treatments, such as washing, water, perspiration, rubbing and alkali, and are stable to resin finishes.

In the following examples the parts and percentages are by weight and the temperatures in degrees centigrade.

EXAMPLE 1

80 parts of the tetrasodium salt of the dye of formula

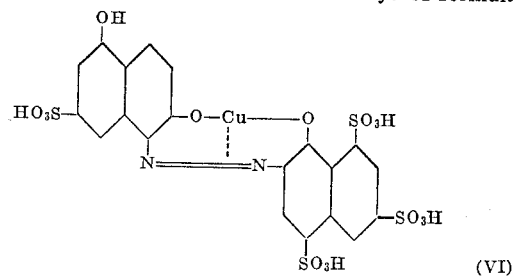

(VI)

are dissolved in 500 parts of warm water with the addition of 6 parts of sodium hydroxide. After cooling to 10°, an ice cold aqueous suspension of the diazo compound of 24.6 parts of 6-acetylamino-2-amino-1-hydroxybenzene-4-sulfonic acid is added in the course of 2 hours. At the same time about 10 parts of powdered calcium hydroxide are strewn in to keep the pH at 10.5 to 11.0. On completion of the coupling reaction the solution of the disazo dye is neutralized with 12 parts of glacial acetic acid. Then about 85 parts of an aqueous 1 molar copper sulfate solution are added dropwise until a slight excess of ionic copper is indicated.

The solution of the di-copper complex compound is made alkaline at 60–70° with 25 parts of calcined sodium carbonate and then freed from the formed calcium carbonate by filtration. The dye is precipitated with sodium chloride, filtered off and stirred into 800 parts of a 7% sodium hydroxide solution. This solution is heated at 90° for 7 hours in order to split off the acetyl group, after which it is neutralized with hydrochloric acid. The aminodisazo compound is precipitated with sodium chloride, suctioned off, washed with sodium chloride solution and dissolved again in 1000 parts of hot water. 19.5 parts of 2,4,5,6-tetrachloropyrimidine are added and the solution stirred for a few hours at pH 5–6 and 70–75° until no further aminoazo dye is present. The final dye is precipitated with sodium chloride, isolated and dried. It is obtained as a dark coloured powder which dissolves in water to give blue solutions. It dyes regenerated cellulosic fibers in navy blue shades. The dyeings have excellent light and wet fastness properties and especially a good stability to resin finishes.

A similar dye is obtained when the 24.6 parts of the diazo component used in the foregoing example are replaced by the same amount of 4-acetylamino-2-amino-1-hydroxy-benzene-6-sulfonic acid.

Dyeing instruction 2 parts of the dye described in the foregoing example are dissolved in 4000 parts of softened water at 40°. 100 parts of a mercerized cotton fabric, previously wetted out, are entered into this dyebath, after which 110 parts of calcined sodium sulfate and 30 parts of calcined sodium carbonate are added. The temperature is raised to 100° in 30 minutes, a further 110 parts of calcined sodium sulfate being added after 10 minutes and a further 100 parts after 20 minutes. On reaching the boil a final 50 parts of calcined sodium carbonate are added and the bath is maintained at the boil for 1 hour. The dyed fabric is then removed, rinsed with water and dried. It is dyed in a navy blue shade which is fast to light and wet treatments.

In the following table are listed further dyes conforming to the present process. These are obtained when in Example 1 in place of 2,4,5,6-tetrachloropyrimidine the halopyrimidines listed in column A are condensed in the same way with the aminodisazo dyes.

TABLE 1

| Example No. | A | Shade on cotton |
|---|---|---|
| 2 | 2,4,6-trichloropyrimidine | Navy blue. |
| 3 | 2,4,6-tribromopyrimidine | Do. |
| 4 | 2,4,5,6-tetrabromopyrimidine | Do. |
| 5 | 2,4,6-trichloro-5-methylpyrimidine | Do. |
| 6 | 2,4,6-trichloro-5-chloromethylpyrimidine | Do. |
| 7 | 2,4,6-trichloro-5-bromopyrimidine | Do. |

EXAMPLE 8

65 parts of the trisodium salt of the dye of formula

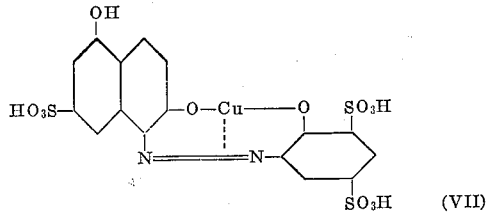

(VII)

are dissolved in 500 parts of warm water and the solution cooled to 0–5°. At this temperature the diazo compound obtained with 37 parts of 2-amino-6-acetylaminonaphthalene-4,8-disulfonic acid is added, together with an amount of 20% sodium carbonate solution sufficient to maintain the pH value at 9–10. The mixture is stirred at 0–5° in the alkaline pH region of about 9.5 until the coupling reaction is complete, which is the case after a few hours. The disazo dye formed is precipitated with sodium chloride, suctioned off and dissolved in 2000 parts of warm water. 100 parts of a 50% sodium acetate solution are added and the solution then adjusted to pH 5.5 with acetic acid. A solution of 25 parts of $CuSO_4 \cdot 5H_2O$ in 140 parts of water is added at 30–40° with stirring, and over the next 3 hours or so 283 parts of 3% hydrogen peroxide are added dropwise, after which the mixture is stirred for a further hour at 30°. The coppered dye is precipitated, suctioned off and hydrolyzed to the aminodisazo compound by treatment with 5% sodium hydroxide solution at 80–90°. This compound is then reacted with 19.5 parts of 2,4,5,6-tetrachloropyrimidine as described in Example 1. The resulting dye is precipitated with sodium chloride, isolated and dried. It is a dark coloured powder which dissolves in water with a blue coloration and dyes cotton and regenerated cellulosic fibers in dark blue shades. The dyeings have excellent fastness to light and to wet treatments.

Another dye giving dyeings of navy blue shade is obtained when the 65 parts of the copper-containing monoazo dye specified in this example are replaced by 80 parts of the monoazo dye used in Example 1.

EXAMPLE 9

72 parts of the trisodium salt of the dye of formula

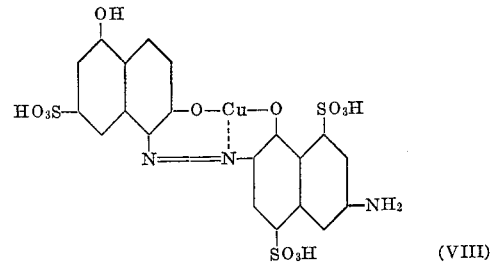

(VIII)

are dissolved in 500 parts of water and the solution cooled to 10–15°. An ice cold solution of the diazo compound of 39 parts of 2-aminonaphthalene-4,6,8-trisulfonic acid showing an acid reaction to Congo red indicator is gradually added to the solution, with the simultaneous addition in portions of about 100 parts of a 20% aqueous sodium carbonate solution to maintain the pH at 8–9. After stirring for 30 minutes, the coupling reaction giving the aminodisazo dye is complete. The dye is precipitated from the warm lye with sodium chloride, suctioned off, dissolved, condensed with 19 parts of 2,4,6-trichloropyrimidine by the procedure of Example 1 and isolated. While still moist the dye is submitted to the oxidative coppering reaction described in Example 8, after which it is precipitated with sodium chloride, filtered off and dried. It dyes cotton and regenerated cellulosic fibers in navy blue shades of good light and wet fastness.

EXAMPLE 10

72 parts of the trisodium salt of the dye of Formula VIII are dissolved in 500 parts of water with the addition of 6 parts of sodium hydroxide and coupled at 10–15° with a suspension of the diazo compound of 27 parts of 2-amino-1-hydroxybenzene-4,6-disulfonic acid. The pH is kept at 10.5–11.0 by gradual addition of about 10 parts of powdered calcium hydroxide. On completion of the coupling reaction the solution of the disazo dye is neutralized with 12 parts of glacial acetic acid, on which a 1 molar copper sulfate solution is added at 50–60° until an excess of ionic copper is indicated. The solution is freed from calcium as described in Example 1, after which the copper-containing disazo dye is salted out with sodium chloride, filtered off and dissolved in water while still moist. The amino group of the dye is condensed with 19.5 parts of 2,4,5,6-tetrachloropyrimidine as described in Example 1. The resulting dye is precipitated from the warm medium with sodium chloride, filtered off, dried and ground. It is then obtained as a dark coloured powder which dissolves in water to give blue solution. It dyes cotton and fibers of regenerated cellulose in navy blue shades of good light and wet fastness; these dyeings have especially a good stability to resin finishing. The identical dye is obtained when the diazo compound of 25.3 parts of 1-aminobenzene-3,5-disulfonic acid is coupled at about 10° and pH 8–9 with 72 parts of the trisodium salt of the dye of Formula VIII, on which the aminodisazo dye is reacted with 19 parts of 2,4,6-trichloropyrimidine and coppered with oxidation.

EXAMPLE 11

55 parts of the aminodisazo dye of the formula

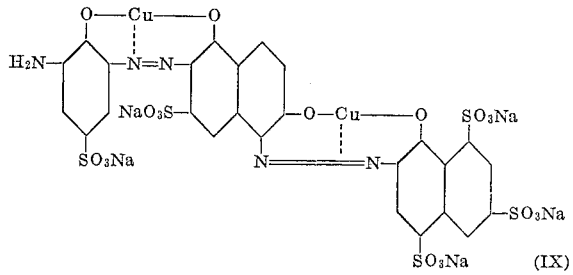

which is obtained in accordance with Example 1 in the form of the pentasodium salt, are dissolved in 600 parts of water at room temperature. Over 1 hour the solution is allowed to run with stirring into an ice cold aqueous suspension of 9.3 parts of cyanuric chloride. By simultaneous dropwise addition of dilute sodium hydroxide solution, the pH value is maintained at 5.5–6.5. On completion of the reaction, the dichlorotriazinyl dye thus formed is salted out, filtered off and dried in vacuum at 30–40°. It dyes cotton and fibers of regenerated cellulose by the method described below in very fast dark blue shades.

Dyeing instruction 2 parts of the dye of this example are dissolved in 3000 parts of softened water at 40°. 100 parts of a cotton or rayon fabric, previously wetted out with water, are entered into the dye-bath and over the next 30 minutes the temperature is increased to 60° with gradual simultaneous addition of 100 parts of calcined sodium sulfate. Subsequently 6 parts of sodium hydrogen carbonate are added and the bath held at 60° for a further 30 minutes. In the next 10 minutes 6 parts of calcined sodium carbonate are added in portions and the same temperature is maintained for a further 15 minutes. The dryed fabric is then removed, rinsed with hot water, soaped with a boiling 0.3% solution of a nonionic detergent, rinsed again and dried. A dark blue dyeing is obtained which is fast to light and wet treatments.

EXAMPLE 12

20 parts of a 25% aqueous ammonia solution are added to the solution of the dichlorotriazine dye obtained in accordance with Example 11 and the reaction solution stirred for 2 hours at 40°. On completion of the reaction the monochlorotriazine dye formed is salted out, filtered off and dried. It dyes cotton and regenerated cellulosic fibers by the method described in Example 1 in dark blue shades.

EXAMPLE 13

The solution of the dichlorotriazine dye obtained in accordance with the particulars of Example 11 is mixed with a solution of 9.75 parts of sodium 1-aminobenzene-4-sulfonate in 90 parts of water and stirred for a few hours at 45–50° while the pH value is maintained at 6–6.5 by dropwise addition of 15% sodium carbonate solution. On completion of the reaction the monochlorotriazine dye is salted out, filtered off and dried. It dyes cotton and regenerated cellulosic fibers by the dyeing method described in Example 1 in dark blue shades.

The identical dye is obtained when 55 parts of the aminodisazo dye of Formula IX in the form of its pentasodium salt are dissolved in 600 parts of water at room temperature, a solution of 17.5 parts of sodium 4-(4',6'-dichloro-1',3',5'-triazinyl-2'-amino)-benzene-1-sulfonate in 180 parts of water is added thereto and the whole stirred for several hours at 45–50° while the pH value is kept at 5–6 by dropping in 15% sodium carbonate solution.

EXAMPLE 14

65 parts of the trisodium salt of the dye of Formula VII are dissolved in 500 parts of warm water. The solution is cooled to 10–15° and at this temperature the diazo compound of 50 parts of 2-amino-6-(2',4',5'-trichloropyrimidyl-6'-amino)-naphthalene-4,8-disulfonic acid is added, together with the amount of 20% sodium carbonate solution necessary to maintain the pH value at 9–10. The mixture is stirred at 10–15° until the coupling reaction is complete. The disazo dye thus formed is precipitated with sodium chloride, suctioned off and dissolved in 2000 parts of water, on which it is coppered with oxidation in the manner described in Example 8. After precipitation with sodium chloride, filtration and drying, a dye is obtained which is identical with that of Example 8.

EXAMPLE 15

80 parts of the tetrasodium salt of the dye of Formula VI are dissolved in 500 parts of warm water with the addition of 6 parts of sodium hydroxide. After cooling to 10°, an aqueous suspension of the diazo compound of 26 parts of 6-acetylamino-2-amino-1-methoxybenzene-4-sulfonic acid is gradually added with simultaneous dropwise addition of 20% sodium carbonate solution to keep the pH value at 8.0–9.0. When the coupling reaction has run its course, the disazo dye formed is precipitated with sodium chloride and filtered off. The filtercake is dissolved in 800 parts of hot water with the subsequent addition of 20 parts of diethanolamine, a solution of 25 parts of crystallized copper sulfate in 100 parts of water and 30 parts of 20% ammonia solution. The coppering reaction is then conducted by boiling for 12 hours with reflux. On completion of the reaction the di-copper complex is salted out and filtered off. The further procedure is as described in Example 1 and comprises cleavage of the acetyl group with sodium hydroxide solution and condensation with 2,4,5,6-tetrachloropyrimidine. The final dye is identical with that of Example 1.

EXAMPLE 16

55 parts of the aminodisazo dye of Formula IX in the form of its pentasodium salt are dissolved in 600 parts of water at about 40°. A solution of 14 parts of 2,3-dichloroquinoxaline-6-carboxylic acid chloride in 50 parts of benzene is dropped in and 15% sodium carbonate solution added at 40–45° with vigorous stirring to keep the pH at 6–6.5. When the free amino group is no longer indicated, the dye is salted out, filtered off and dried at 40–50° in vacuum. On grinding, it is obtained as a dark blue powder which dissolves in water to give navy blue solutions and dyes cellulosic fibers in navy blue shades of good light and wet fastness.

The 2,3-dichloroquinoxaline-6-carboxylic acid chloride can be replaced by the equivalent amount of 2,3-dichloroquinoxaline-6-sulfonic acid chloride or -6-isocyanate, from which similar dyes are obtained.

EXAMPLE 17

72 parts of the trisodium salt of the dye of Formula VII are dissolved in 500 parts of water and the solution cooled to 10–15°. An ice-cold solution of the diazo compound of 30.5 parts of 2-aminonaphthalene-4,8-disulfonic acid having an acid reaction to Congo red indicator is gradually added, with the simultaneous addition in portions of about 100 parts of 20% sodium carbonate solution to maintain a pH value of 8–9. After stirring for a further 30 minutes, the coupling reaction is complete.

The aminodisazo dye is precipitated from the warm medium by means of sodium chloride and suctioned off. It is dissolved in 2000 parts of water at room temperature, the solution cooled to 0–2° and the dye acylated by dropping in 14 parts of β-chloropropionic acid chloride with sufficient 20% sodium carbonate solution to keep the pH at 5–6. When acylation is complete, the dye is salted out, suctioned off and dissolved in 2000 parts of water at 40°. 100 parts of 50% sodium acetate solution are added and the pH adjusted to 5.5 with concentrated acetic acid. A solution of 25 parts of crystallized copper sulfate in 150 parts of water are added, then at 35–40° 285 parts of 3% hydrogen peroxide are dropped in at 35–40° over about 3 hours. The mixture is stirred for a further hour at 35–40°. The coppered dye is salted out, filtered off, dried and ground. It is obtained as a dark blue coloration and dyes cellulosic fibers in navy blue shades fast to light and wet treatments.

The identical dye is obtained when, in place of 72 parts of the trisodium salt of the dye of Formula VIII, 81 parts of the trisodium salt of the dye of formula

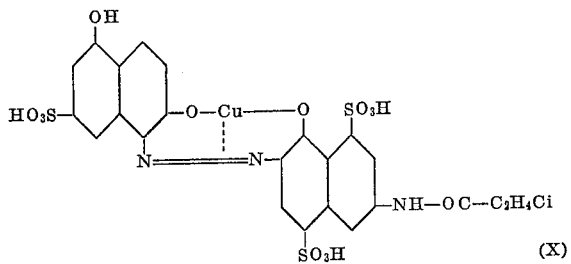

are used and the resulting disazo dye coppered with oxidation.

EXAMPLE 18

100 parts of the tetrasodium salt of the aminodisazo dye of the formula

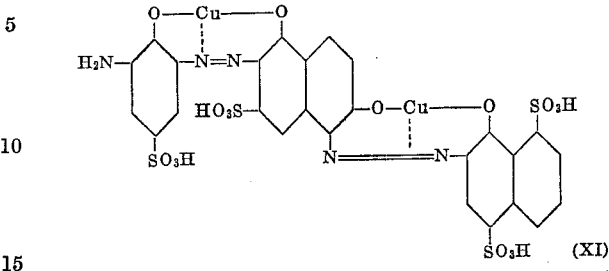

as it is obtained according to Example 1, when, instead of 2-aminonaphthalene-4,6,8-trisulfonic acid, and equivalent amount of 2-aminonaphthalene-4,8-disulfonic acid is employed, are dissolved in 1500 parts of water at 50–60°. After the addition of a solution of 40 parts of sodium 2,4-dichloro-6-phenylamino-1,3,5-triazine-3'-sulfonate, the mixture is stirred at 50–60° until no further amino dye is present, the pH value being maintained at 8.0 to 9.0 by dropping in a 20% sodium carbonate solution. After completion of the reaction the formed dye is precipitated by means of sodium chloride, filtered off and dried. It dyes cotton and fibers of regenerated cellulose according to the dyeing method described in Example 1 in navy blue shades fast to light and to wet treatments.

The following table contains details of further copper-containing reactive disazo dyes which are obtained according to the procedures of Examples 1 to 18. They correspond to the Formula I and are distinguished in the table by the radicals $$\underset{A-}{OH,}\ \underset{B-}{OH}$$

and Z and by the shade of the dyeing on cotton.

TABLE

| Example No. | $\underset{A-}{OH}$ I | $\underset{B-}{OH}$ II | Z = radical of — III | Shade IV |
|---|---|---|---|---|
| 19 | 2-hydroxy-3,5-disulfophenyl-(1) | 1-hydroxy-6-Z-amino-4,8-disulfonaphthyl-(2) | 2,4,6-trichloropyrimidine | Navy blue. |
| 20 | do | do | 2,4-dichloro-5-chloromethyl-6-methyl-pyrimidine | Do. |
| 21 | do | do | Acrylic acid chloride | Do. |
| 22 | do | do | 2,4-dichloro-6-β-hydroxyethyl-amino-1,3,5-triazine | Do. |
| 23 | 1-hydroxy-5,7-disulfonaphthyl-(2) | do | do | Do. |
| 24 | 1-hydroxy-6,8-disulfonaphthyl-(2) | do | do | Do. |
| 25 | 2-hydroxy-3-Z-amino-5-sulfophenyl-(1) | 1-hydroxy-4,6,8-trisulfonaphthyl-(2) | 2,4-dichloro-6-(3'-sulfophenyl-amino)-1,3,5-triazine | Do. |
| 26 | do | do | 2,4-dichloro-6-methoxy-1,3,5-triazine | Do. |
| 27 | do | do | 2,4-dichloro-6-dimethylamino-1,3,5-triazine | Do. |
| 29 | do | do | 2,4-dibromo-5-bromo-methyl-6-methyl-pyrimidine | Do. |
| 30 | 1-hydroxy-6-Z-amino-4,8-disulfonaphthyl(2) | do | 2,4-dichloro-5-chloromethylpyrimidine | Do. |
| 31 | do | do | 2,4-dibromo-6-amino-1,3,5-triazine | Do. |
| 32 | 1-hydroxy-6-Z-amino-4,8-disulfonaphthyl-(2) | 1-hydroxy-5,7-disulfonaphthyl-(2) | Chloroacetic acid chloride | Do. |
| 33 | do | do | α-Chloroacrylic acid chloride | Do. |
| 34 | do | do | 2,4-dichloro-6-(2'-hydroxy-propylamino)-1,3,5-triazine | Do. |
| 35 | 2-hydroxy-3-Z-amino-5-sulfophenyl-(1) | do | 2,4-dichloro-6-(2'-sulfoethylamino)-1,3,5-triazine | Do. |
| 37 | do | 1-hydroxy-4,7-disulfonaphthyl-(2) | 2,4-dichloro-6-phenylamino-1,3,5-triazine-3'-sulfonic acid | Do. |
| 38 | do | 1-hydroxy-6,8-disulfonaphthyl-(2) | 2,4-dichloro-6-(2'-carboxyphenylamino)-1,3,5-triazine-4'-sulfonic acid | Do. |
| 39 | do | do | 2,4-dichloro-6-(naphthyl-1'-amino)-1,3,5-triazine-3',6'-disulfonic acid | Do. |
| 40 | do | do | 2,4-dichloro-6-(naphthyl-2'-amino)-1,3,5-triazine-4',8'-disulfonic acid | Do. |
| 41 | do | 1-hydroxy-4,8-disulfonaphthyl-(2) | 2,4-dichloro-6-(naphthyl-1'-amino)-1,3,5-triazine-4',6'-disulfonic acid | Do. |
| 42 | do | 1-hydroxy-4,6,8-trisulfonaphthyl-(2) | 2,4-dibromo-6-phenylamino-1,3,5-triazine-4'-sulfonic acid | Do. |
| 43 | do | do | Cyanuric bromide | Do. |
| 44 | do | do | Bromoacetic acid chloride | Do. |
| 45 | do | do | α,β-Dibromo-propionic acid chloride | Do. |
| 46 | 1-hydroxy-4,6,8-trisulfonaphthyl-(2) | 2-hydroxy-3-Z-amino-5-sulfophenyl-(1) | β-bromopropionic acid chloride | Do. |
| 47 | do | do | 2,4-dichloro-6-(3'-methoxypropylamino)-1,3,5-triazine | Do |
| 48 | do | do | 2,4,6-trichloro-5-carboxymethyl-pyrimidine | Do. |

| Example No. | OH<br>|<br>A—<br>I | OH<br>|<br>B—<br>II | Z=radical of—<br>III | Shade<br>IV |
|---|---|---|---|---|
| 49 | do | do | 2,4-dichloro-6-carboxymethylamino-1,3,5-triazine. | |
| 50 | do | 1-hydroxy-6-Z-amino-4,8-disulfo-naphthyl-(2). | α,β-Dichloropropionic acid chloride. | Do. |
| 51 | 2-hydroxy-3,5-disulfophenyl-(1) | do | γ-Chlorocrotonic acid chloride. | Do. |
| 52 | do | do | 2,4-dichloro-6-di-(2'-hydroxyethyl)-amino-1,3,5-triazine. | Do. |
| 53 | 1-hydroxy-6-Z-amino-4,8-disulfo-naphthyl-(2). | 1-hydroxy-4,6,8-trisulfonaphthyl-(2) | 2,4-dichloro-6-diethylamino-1,3,5-triazine. | Do. |
| 54 | do | do | 2,4-dichloro-6-(3'-methoxybutylamino)-1,3,5-triazine. | Do. |
| 55 | do | do | 2,4-dichloro-6-(2'-carboxyphenylamino)-1,3,5-triazine. | Do. |
| 56 | do | do | 2,4,6-trichloro-5-carboxypyrimidine. | Do. |
| 57 | do | do | β,β-Dichloroacrylic acid chloride. | Do. |
| 58 | 1-hydroxy-6-Z-amino-4,8-disulfo-naphthyl-(2). | 1-hydroxy-4,6,8-trisulfonaphthyl-(2) | 2,4-dichloro-6-methylamino-1,3,5-triazine. | Do |
| 59 | do | do | Methacrylic acid chloride. | Do. |
| 60 | 2-hydroxy-3-Z-amino-5-sulfophenyl-(1). | 1-hydroxy-4,6,8-trisulfonaphthyl-(2) | α-Bromacrylic acid chloride. | Do. |
| 61 | do | do | 2,4-dichloro-6-(4'-carboxyphenyl-amino)-1,3,5-triazine. | Do. |
| 62 | do | do | 2,4-dichloro-6-(β-ethoxyethyl-amino)-1,3,5-triazine. | Do. |
| 63 | do | do | 2,4-dichloro-6-N-methyl-N-carboxymethylamino-1,3,5-triazine. | Do. |
| 64 | do | do | 2,4-dichloro-6-ethylamino-1,3,5-triazine. | Do. |
| 65 | do | do | 2,4-dichloro-6-(2'-carboxyethyl-amino)-1,3,5-triazine. | Do. |
| 66 | do | do | 2,4-dichloro-6-ethoxy-1,3,5-triazine. | Do. |
| 67 | do | do | 2,4-dibromo-5-bromoethylpyrimidine. | Do. |
| 68 | do | do | 2,4-dichloro-6-N-methyl-N-β-sulfoethyl-amino-1,3,5-triazine. | Do. |
| 69 | 2-hydroxy-3-Z-amino-5-sulfophenyl-(1). | 1-hydroxy-6,8-disulfonaphthyl-(2) | 2,4-dichloro-6-N-methyl-N-β-sulfoethyl-amino-1,3,5-triazine. | Do. |
| 70 | do | do | 2,4-dichloro-6-phenylamino-1,3,5-triazine-2',4'-disulfonic acid. | Do. |
| 71 | do | 1-hydroxy-4,6,8-trisulfonaphthyl-(2) | 2,4-dichloro-6-phenylamino-1,3,5-triazine-2',5'-disulfonic acid. | Do. |
| 72 | do | do | 2,4-dichloro-6-(naphthyl-1'-amino)-1,3,5-triazine-4'-sulfonic acid. | Do. |
| 73 | do | do | 2,4-dichloro-6-(naphthyl-2'-amino)-1,3,5-triazine-6'-sulfonic acid. | Do. |

Formulae of representative dyes of the foregoing examples are as follows:

Examples 1 and 15

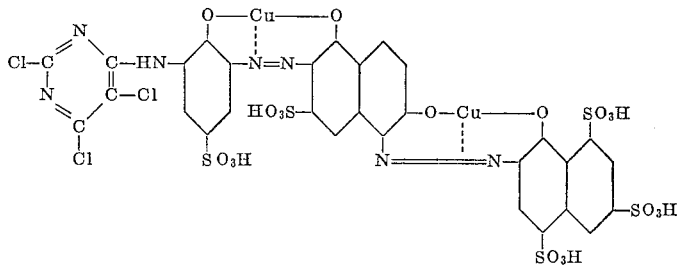

Example 2

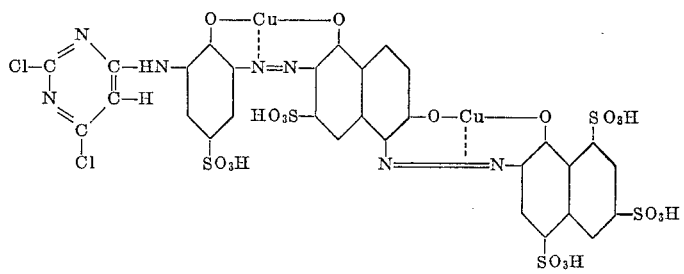

Examples 8 and 14

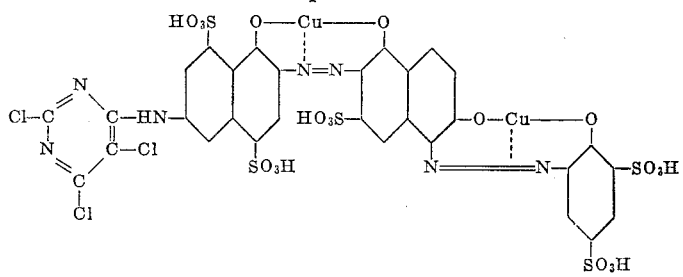

3,422,084
EXAMPLE 9
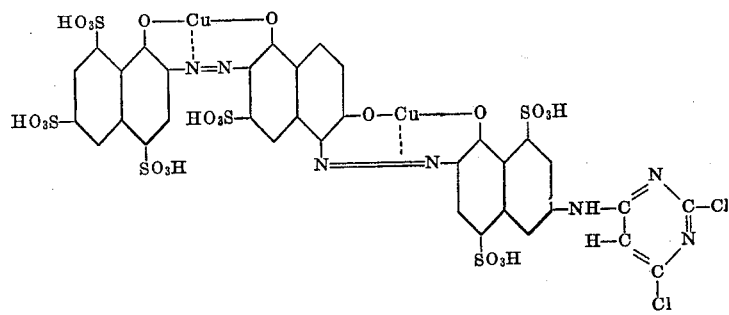
EXAMPLE 10
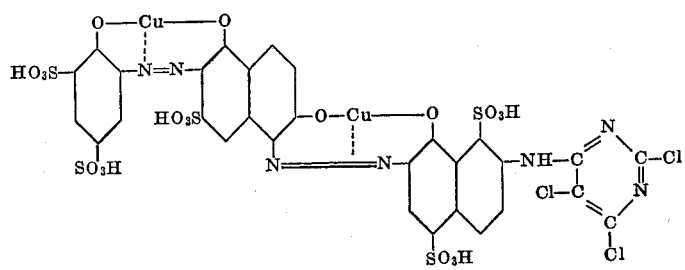
EXAMPLE 11
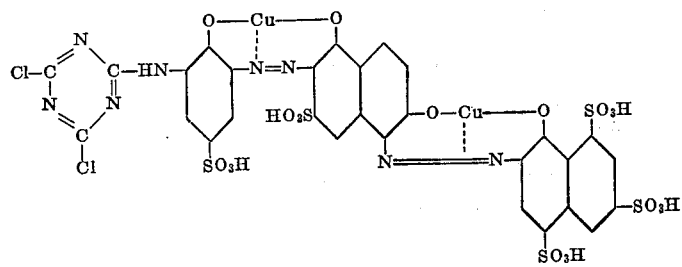
EXAMPLE 12
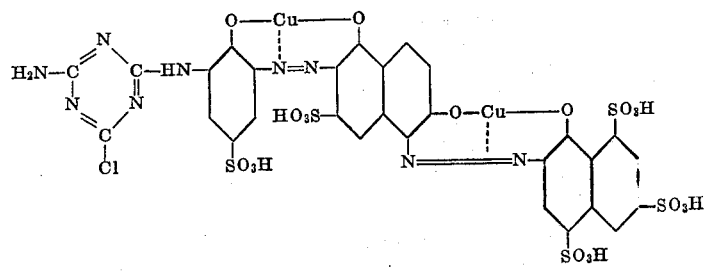
EXAMPLE 13
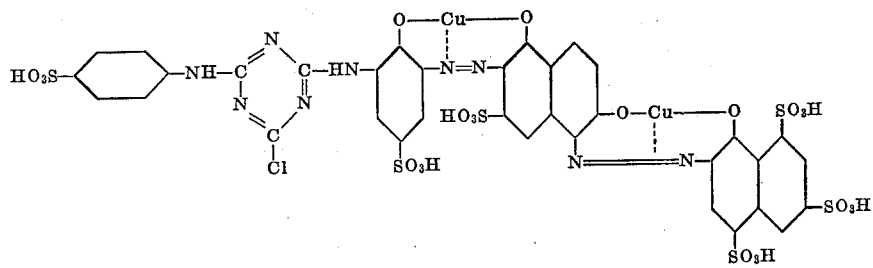

EXAMPLE 16

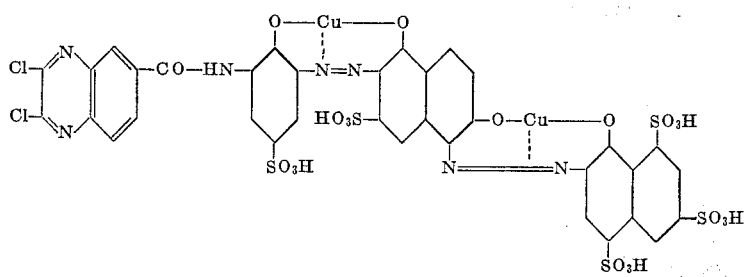

EXAMPLE 17

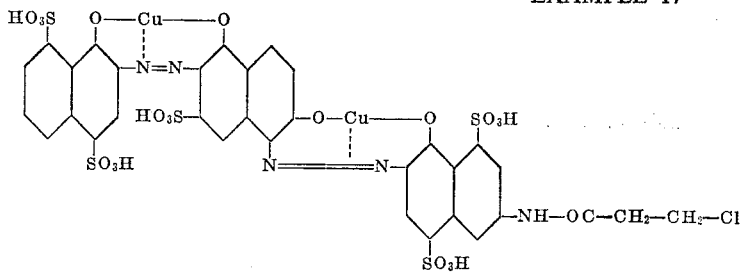

EXAMPLE 18

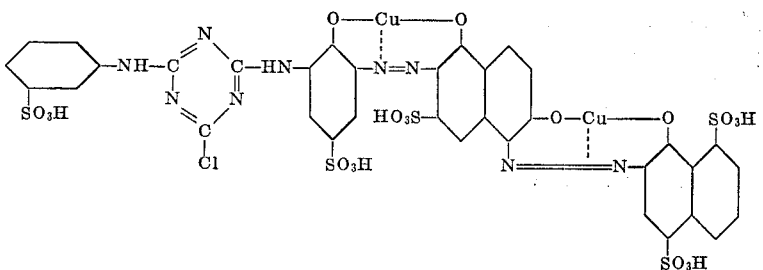

Having thus disclosed the invention what we claim is:

1. Reactive cupriferous disazo dyes of the formula

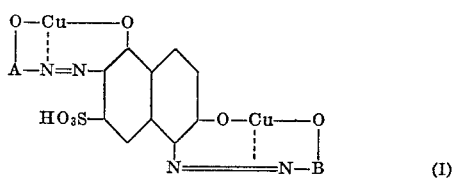

wherein:
one of the radicals A and B is a member selected from the group consisting of a phenyl radical and a naphthyl radical bound to the —N=N— group in the 2 position,
the second is a naphthyl radical bound to the —N=N— group in the 2 position,
one of the radicals A and B bears one —NH—Z group,
Z is a member selected from the group consisting of lower haloalkanoyl, lower alkenoyl, lower haloalkenoyl, dihalopyrimidyl, trihalopyrimidyl, dihalopyrimidyl-5-methylene, 2,3 - dihalo - quinoxalyl - 6 - carbonyl-, 2,3-dihaloquinoxalyl-6-sulfonyl, 2,3 - dihaloquinoxalyl-6-aminocarbonyl, dihalo - 1,3,5 - triazinyl and monohalo-1,3,5-triazinyl, halo being selected from the group consisting of chlorine and bromine,
the whole dye molecule including the —NH—Z group contains at least 5 sulfonic acid groups and
the O atom in each instance is in ortho position to the azo group.

2. Reactive cupriferous dyes of the Formula I according to claim 1,
wherein:
one of the radicals A and B is a member selected from the group consisting of a phenyl radical and a naphthyl radical bound to the —N=N— group in the 2 position,
the second is a naphthyl radical bound to the —N=N— group in the 2 position,
one of the radicals A and B bears one —NH—Z group,
Z is a member selected from the group consisting of dichloropyrimidyl, dibromopyrimidyl, dichloro-5-bromopyrimidyl, dichloro-5-lower alkyl-pyrimidyl, dichloro-5-carboxypyrimidyl, dichloro - 5 - carboxymethyl - pyrimidyl, dichloro -5-chloromethyl-pyrimidyl, trichloropyrimidyl, tribromopyrimidyl, 2,4-dichloro - pyrimidyl-5-methylene, 2,4-dibromo-pyrimidyl - 5 - methylene, 2,4 - dichloro-6-methylpyrimidyl-5-methylene and 2,4-dibromo-6-methylpyrimidyl-5-methylene,
the whole dye molecule including the —NH—Z group contains at least 5 sulfonic acid groups and
the O atom in each instance is in ortho position to the azo group.

3. Reactive cupriferous disazo dyes of the Formula I according to claim 1,
wherein:
one of the radicals A and B is a member selected from the group consisting of a phenyl radical and a naphthyl radical bound to the —N=N— group in the 2 position,
the second is a naphthyl radical bound to the —N=N— group in the 2-position,
one of the radicals A and B bears one group of the formula

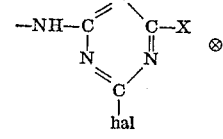

hal is a member selected from the group consisting of chlorine and bromine,

X is a member selected from the group consisting of chlorine, bromine, lower alkoxy, amino, lower alkylamino, lower hydroxyalkylamino, lower alkoxyalkylamino, di-(lower alkyl)-amino; di-(lower hydroxyalkyl)-amino, lower carboxyalkylamino, N-lower alkyl-N-lower carboxyalkylamino, lower sulfoalkylamino, N-lower alkyl-N-lower sulfoalkylamino, carboxyphenylamino, carboxysulfophenylamino, sulfophenylamino, disulfophenylamino, sulfonaphthylamino and disulfonaphthylamino, the whole dye molecule including the group ⊗ contains at least 5 sulfonic acid groups and the O atom in each instance is in ortho position to the azo group.

4. A 5-(2'-naphthylazo)-2-phenylazo-3-sulfonaphthyl dye according to claim 1.

5. A 2,5-di-(2'-naphthylazo)-3-sulfonaphthyl dye according to claim 1.

6. A 2-(2'-naphthylazo)-5-phenylazo-3-sulfonaphthyl dye according to claim 1.

7. The reactive cupriferous disazo dye according to claim 1 of the formula

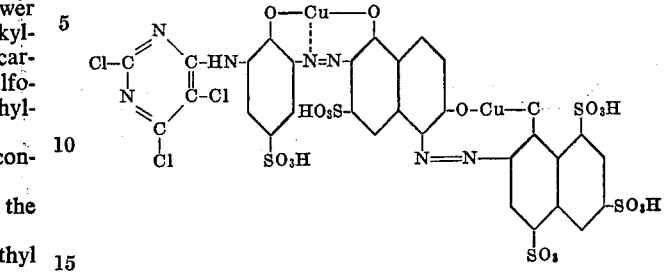

8. The reactive cupriferous disazo dye according to claim 1 of the formula

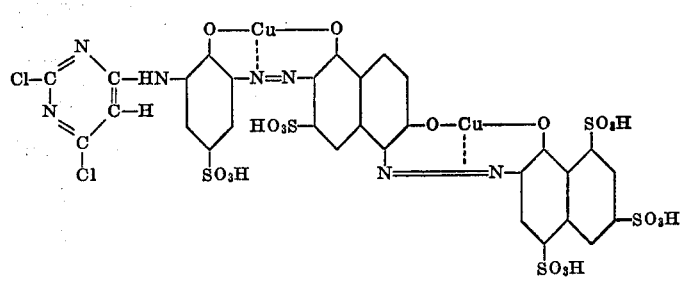

9. The reactive cupriferous disazo dye according to claim 1 of the formula

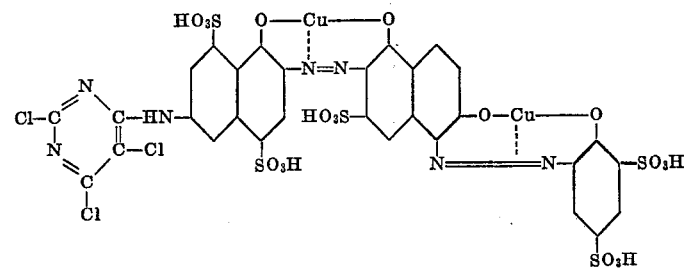

10. The reactive cupriferous disazo dye according to claim 1 of the formula

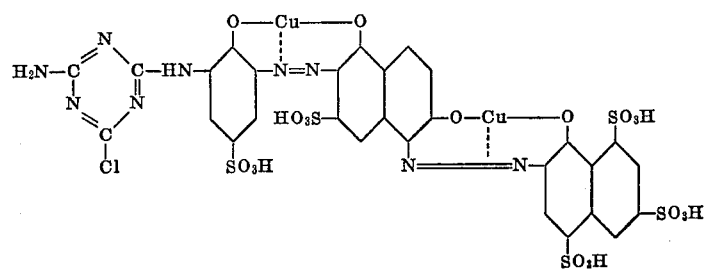

11. The reactive cupriferous disazo dye according to claim 1 of the formula
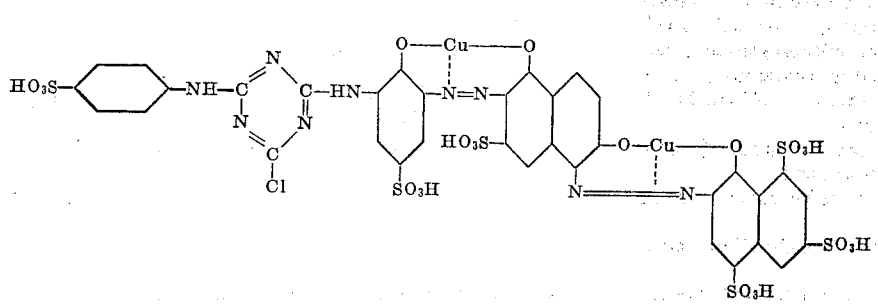
References Cited
UNITED STATES PATENTS
| | | | |
|---|---|---|---|
| 3,036,058 | 5/1962 | Andrew et al. | 260—146 |
| 3,125,562 | 3/1964 | Ammann et al. | 260—146 |
| 3,227,704 | 1/1966 | Schweizer et al. | 260—146 |
| 3,227,705 | 1/1966 | Baker et al. | 260—148 |
| 3,259,618 | 7/1966 | Andrew | 260—146 |
FLOYD D. HIGEL, *Primary Examiner.*
U.S. Cl. X.R.
260—148, 150, 151; 8—41, 42, 43, 13

PO-1050
(5/69)

UNITED STATES PATENT OFFICE
CERTIFICATE OF CORRECTION

Patent No. 3,422,084          Dated  January 14, 1969

Inventor(s) GUENTHER AUERBACH, LUKAS SCHNEIDER and WALTER WEHRLI

It is certified that error appears in the above-identified patent and that said Letters Patent are hereby corrected as shown below:

Column 2, line 18, "reaction." should read --reaction,--; line 35, "radicals" should read --radical--; line 42, "-bromo propionic" should read -- -bromopropionic--; line 49, "of" should read --or--; line 49, "solfonic" should read --sulfonic--. Column 7, line 48, "dryed" should read --dyed--. Column 6, line 74, "solution." should read --solutions.--. Column 8, line 68, "VII" should read --VIII--. Column 9, line 16, "blue coloration" should read --blue powder which dissolves in water with a dark blue coloration--; line 32, in the formula of Example 17, "-C$_2$H$_4$Cl" should read -- -C$_2$H$_4$Cl--. Column 10, line 17, "and" should read --an--. Last line of the Table, Example 48, "carboxymethyl-pyrimidine" should read --carboxymethylpyrimidine--. Column 12, Example 62, "ethoxyethyl-amino" should read --ethoxyethylamino--; Example 65, "carboxyethyl-amino" should read --carboxyethylamino--. Column 13, in each of Example 10 and Example 11,

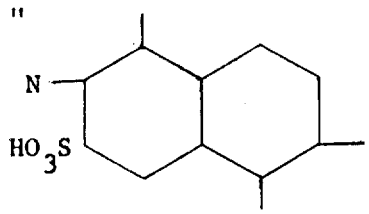     should read --     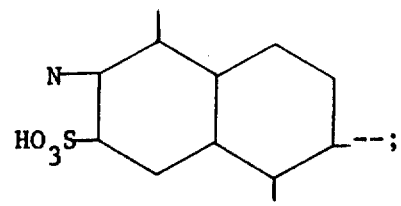 --;

in Example 10, in the left portion of the formula,

" SO$_3$H "     should read     --SO$_3$H--;

in Example 10, in the right portion of the formula,

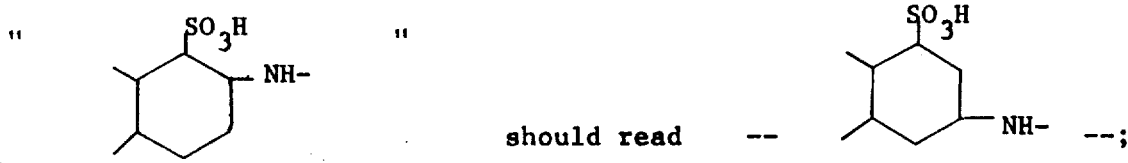

should read --

PO-1050
(5/69)

UNITED STATES PATENT OFFICE
CERTIFICATE OF CORRECTION

PAGE - 2

Patent No. 3,422,084          Dated January 14, 1969

Inventor(s) GUENTHER AUERBACH, LUKAS SCHNEIDER and WALTER WEHRLI

It is certified that error appears in the above-identified patent and that said Letters Patent are hereby corrected as shown below:

In Example 12, the extreme right portion of the formula,

" 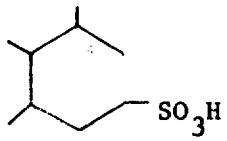 "     should read     -- 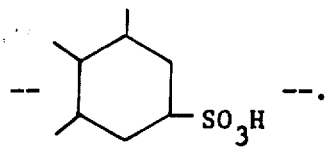 --.

Column 18, in the right portion of the formula of claim 7,

" 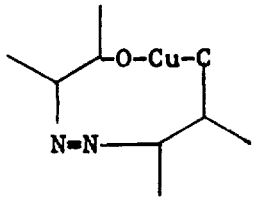 "     should read     -- 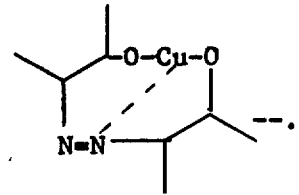 --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents